United States Patent [19]
Hartmann et al.

[11] Patent Number: 5,961,083
[45] Date of Patent: Oct. 5, 1999

[54] ATTACHMENT APPARATUS FOR THE ATTACHMENT OF VEHICLE ACCESSORIES TO A VEHICLE STRUCTURE

[76] Inventors: Jerome Hartmann, 5886 SE. 64th Ave., Carlisle, Iowa 50047; Thomas R. Steinhagen, 2504 Country Side Pl., West Des Moines, Iowa 50265

[21] Appl. No.: 08/963,004

[22] Filed: Nov. 3, 1997

[51] Int. Cl.$^6$ .................................................. A47B 96/06
[52] U.S. Cl. ............................ 248/222.14; 248/231.81; 248/311.2
[58] Field of Search ................ 248/231.81, 220.21, 248/222.11, 222.12, 222.14, 222.51, 222.52, 223.21, 229.16, 311.2, 315, 231.21, 231.31; 224/555, 556, 926, 547; 62/244, 457.3, 239; 165/41, 80.1; 24/537

[56] References Cited

U.S. PATENT DOCUMENTS

| | | | |
|---|---|---|---|
| 1,194,509 | 8/1916 | Kosovsky | 24/535 |
| 2,459,879 | 1/1949 | Hardwick | 248/361 |
| 3,100,324 | 8/1963 | Tutino et al. | 24/346 |
| 3,924,303 | 12/1975 | Elliott | 24/137 R |
| 4,432,525 | 2/1984 | Duvall | 248/430 |
| 4,653,289 | 3/1987 | Hodgetts | 62/239 |
| 4,657,461 | 4/1987 | Smith | 411/340 |
| 4,779,831 | 10/1988 | Anderson | 248/311 |
| 4,819,843 | 4/1989 | Nakayama | 224/42.45 R |
| 4,852,843 | 8/1989 | Chandler | 248/311.2 |
| 4,865,504 | 9/1989 | Ferris | 411/340 |
| 4,892,137 | 1/1990 | Bibik, Jr. | 165/80.1 |
| 4,903,928 | 2/1990 | Shell | 248/225.1 |
| 4,926,953 | 5/1990 | Platt | 180/68.5 |
| 5,012,654 | 5/1991 | Gatti | 62/244 |
| 5,015,205 | 5/1991 | Franks, Jr. | 439/803 |
| 5,022,621 | 6/1991 | Quest | 248/225.2 |
| 5,092,395 | 3/1992 | Amidzich | 165/41 |
| 5,110,079 | 5/1992 | Evenson et al. | 248/222.1 |
| 5,540,409 | 7/1996 | Cunningham | 248/311.2 |
| 5,593,124 | 1/1997 | Wang | 248/231.81 |

*Primary Examiner*—Ramon O. Ramirez
*Assistant Examiner*—Gwendolyn Baxter
*Attorney, Agent, or Firm*—Dick and Harris

[57] ABSTRACT

An attachment apparatus for attachment of a vehicle accessory to a structure in a vehicle including a mount, a beam, and a clamping member. The mount is associated with the vehicle accessory. The beam includes a first end associated with the mount, a second end, and a substantially longitudinal slot therebetween. The slot includes a proximal end near the first end of the beam, a distal end near the second end of the beam, and opposing sidewalls therebetween. One of the opposing walls having an opening to facilitate receipt of the vehicle structure into the longitudinal slot. The clamping member is movably positionable along at least a portion of the beam between the first and second ends thereof. The clamping member effectively clamping the vehicle structure therebetween.

20 Claims, 3 Drawing Sheets

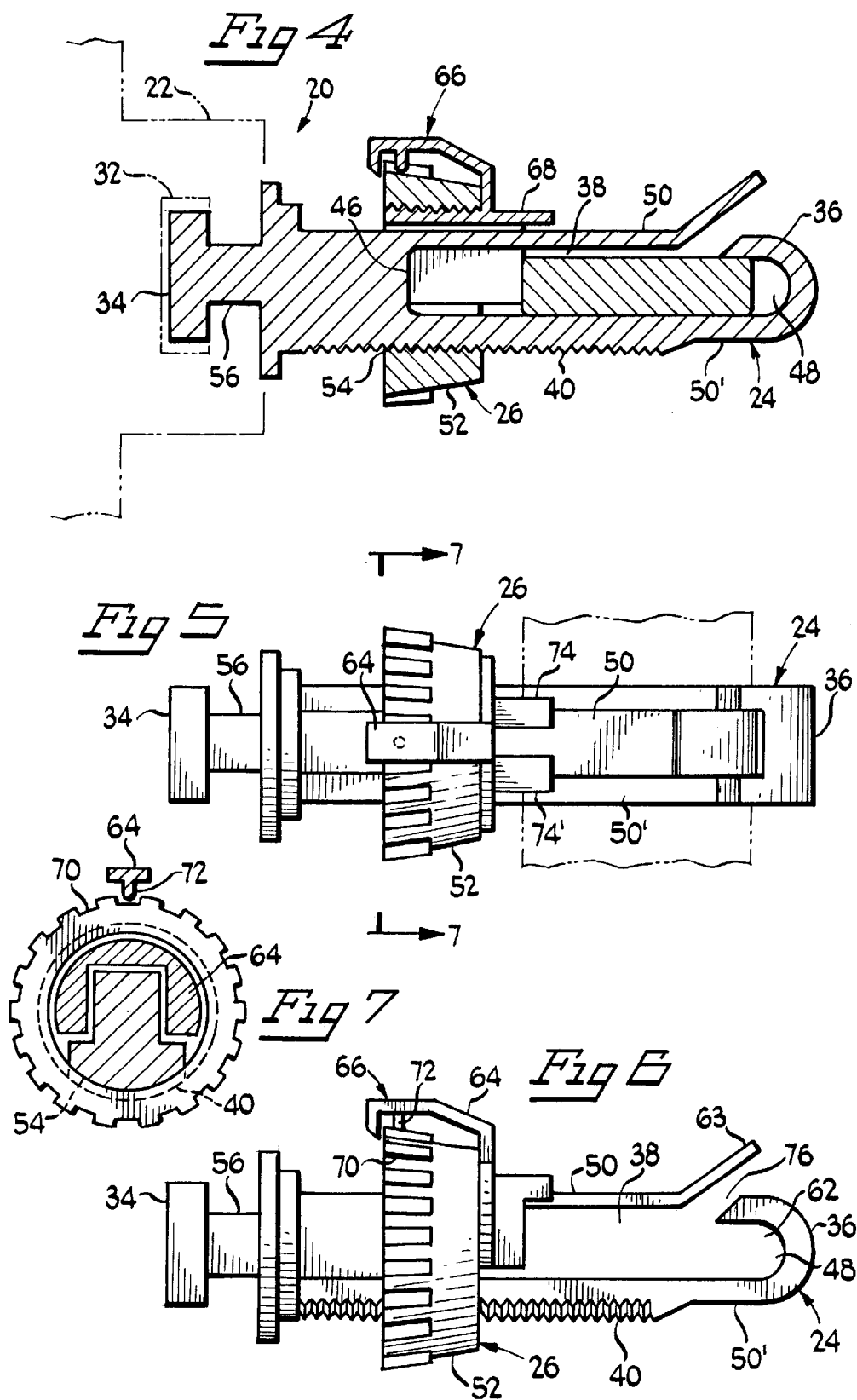

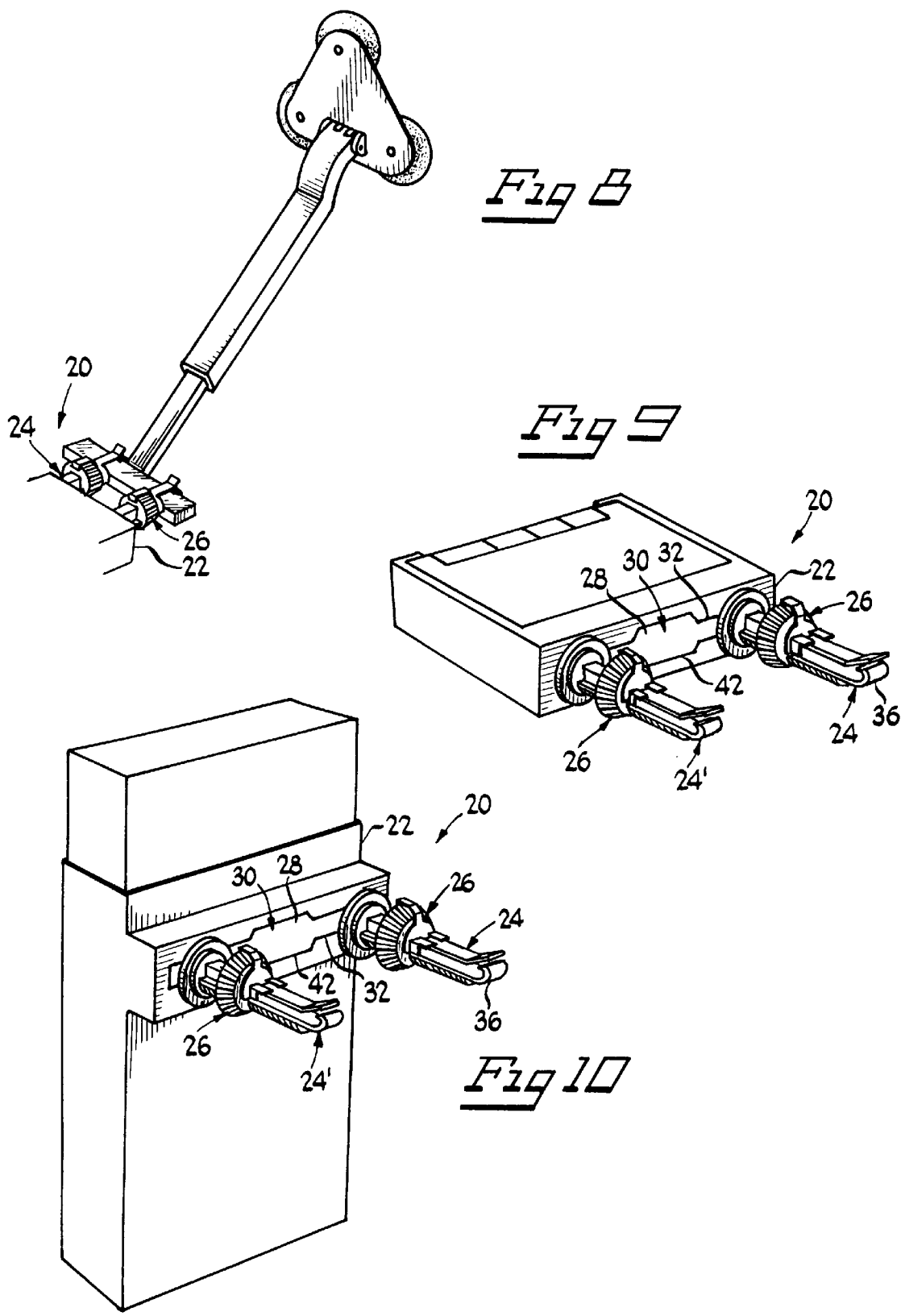

ATTACHMENT APPARATUS FOR THE ATTACHMENT OF VEHICLE ACCESSORIES TO A VEHICLE STRUCTURE

BACKGROUND OF THE INVENTION

1. Field of the invention

The invention relates in general to attachment clips, and, more specifically to clips for attachment of vehicle accessories to a vehicle.

2. Background Art

The use of accessories such as cupholder, notepads, radar detectors, cellular telephone holders, pager holders, and other article holders in vehicles, as well as elsewhere in the home and office, has become increasingly popular. For example, the use of such structures in automobiles or boats has become increasingly popular both due to the greater time people spend in their vehicles, as well as due to the increasing number of different accessories that have become indispensable. Today's vehicles, however, are limited with respect to their ability to properly hold these accessories. Indeed, many smaller cars lack the space and/or the storage areas for retaining these accessories.

As such, a vast number of aftermarket structures have been developed to add storage space or mountings onto an existing vehicle. One such design has incorporated the adhering, or releasable adhering (through the use of hook and loop fasteners) of a structure or mount directly to an existing vehicle structure such as a dashboard. Such a structure is substantially permanent, and often destroys the underlying surface to which it is attached. Other adhering means, which do not destroy the underlying surface, are often not of sufficient strength. As such, the structure may become detached from the vehicle, possibly destroying the accessory attached thereto. In the situation of an automobile, such a detachment can cause distraction to the driver, which can force the driver to err, possibly causing an accident.

Other structures have been developed to be releasable mounted to a vehicle. In particular, structures and mounts have been adapted for releasable attachment to a vehicle air conditioning or heat vent. These structures generally use hooks or prongs which extend through the vent and hook onto the vanes of the vent. Often times, however, inadvertent bumps or movement of the vehicle cause the hooks to become detached from the vent. Although some structures or mounts are more rigidly mounted to the vent, vibration and the constant vehicle movements eventually loosen these structures and permit the structures to dislodge. Even where the structure or mount does not fully become detached from the vanes of the vent, the loosening of the structure becomes increasingly frustrating to the user who must continuously readjust and reposition the structure. Additionally, this dislodging movement of the structure may likewise distract the driver.

SUMMARY OF THE INVENTION

The invention comprises an attachment apparatus for attachment of a vehicle accessory to a structure in a vehicle. The apparatus comprises a mount, at least one beam, and a clamping member. The mount is associated with the vehicle accessory. The at least one beam includes a first end associated with the mount, a second end opposite the first end and a substantially longitudinal slot therebetween. The slot includes a proximal end near the first end of the beam, a distal end near the second end of the beam and opposing walls therebetween. One of the opposing walls has an opening to facilitate receipt of the vehicle structure into the slot. The clamping member is movably positionable along at least a portion of the beam between the first and second ends thereof. This clamping member effectively clamps the vehicle structure between itself and the second end.

In a preferred embodiment, the first end of the beam includes a mount engagement region. The mount includes a channel configured to engage the mount engagement region, to, in turn, facilitate retained slidable movement of the mount engagement region along the channel. In such an embodiment, the apparatus may further include means for rotating the beam along a longitudinal axis thereof, relative to the mount. In such an embodiment, the apparatus may further include means for disengaging the beam from the mount.

In another preferred embodiment, the at least one beam further includes a first threadform extending longitudinally between the first and second ends thereof. The clamping member including a ring member extending transversely around the at least one beam. The ring member including a second mating threadform engaging the first threadform of the at least one beam. The rotation of the ring member about the at least one beam member in opposite direction moves the clamping member toward or away from the second end as desired. In such a preferred embodiment, the apparatus further includes means for precluding the inadvertent rotation of the ring member about the beam member.

In such an embodiment, the clamping member further includes a carrier member configured to slidably move along the at least one beam member upon rotation of the ring member about the beam member. The rotation precluding means comprises a pawl associated with the carrier member and a rack associated with the carrier member capable of cooperating with the pawl to releasably restrain the ring member. In such a preferred embodiment, the rack extends around the circumference of the ring member. In another such embodiment, the carrier member further includes at least one longitudinal extension corresponding to the opposing wall having an opening therethrough. The longitudinal extension is positionable to close at least a portion of the opening, to prevent inadvertent removal of the vehicle structure.

In a preferred embodiment, the distal end of the slot member includes a substantially concave region to further facilitate retention of at least a portion of the vehicle structure within the slot.

In another preferred embodiment, the opposing wall having the opening is capable of flexing, to, in turn, temporarily enlarge the opening, which further facilitates the acceptance of the vehicle structure. In such an embodiment, the clamping member includes means for limiting the relative flexing of the opposing wall having the opening.

In yet another preferred embodiment, the opposing side wall having the opening includes a guide member proximate the opening to guide the vehicle structure into the slot.

In a preferred embodiment, the at least one beam comprises two beams, each of the beams independently associated with the mount. Preferably, the opening is positioned proximate the distal end of the slot.

In another preferred embodiment, the vehicle accessory comprises one of the a cellular telephone holder, a notepad holder and a cupholder. Preferably the vehicle structure comprises an automotive air conditioning/heating vent.

BRIEF DESCRIPTION OF THE DRAWINGS

FIG. 4 of the drawings is a cross-sectional view taken above lines 4—4 of FIG. 3;

FIG. 5 of the drawings is a top view of the apparatus;

FIG. 6 of the drawings is a side elevational view of the apparatus;

FIG. 7 of the drawings is a cross-sectional view of the apparatus taken about lines 7—7 of FIG. 5;

FIG. 8 of the drawings is a perspective view of the apparatus attached to a vehicle accessory and a vehicle structure;

FIG. 9 of the drawings is a perspective view of the apparatus attached to a vehicle accessory; and FIG. 10 of the drawings is a perspective view of the apparatus attached to a vehicle accessory.

DETAILED DESCRIPTION OF THE DRAWINGS

Figure 1:
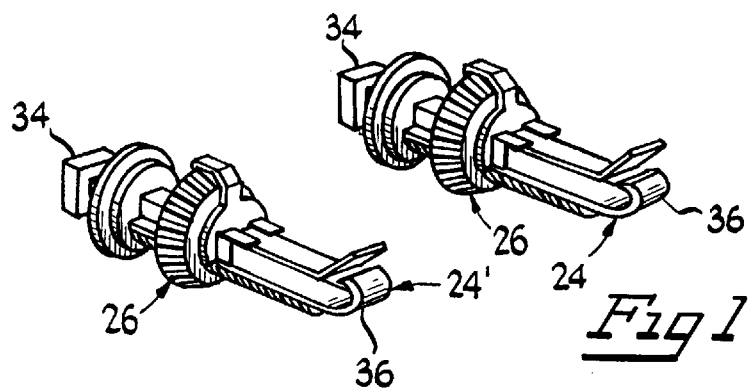
FIG. 1 of the drawings is a perspective view of the apparatus without the mount.
Figure 2:
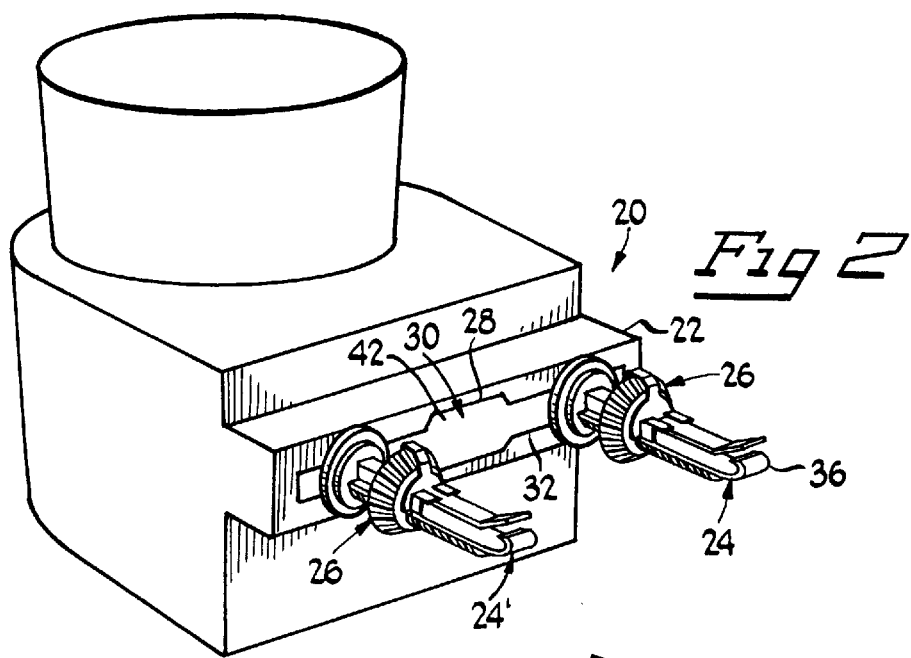
FIG. 2 of the drawings is a perspective view of the apparatus attached to a vehicle accessory.

While this invention is susceptible of embodiment in many different forms, there is shown in the drawings and will herein be described in detail, one specific embodiment with the understanding that the present disclosure can be considered as an exemplification of the principles of the invention and is not intended to limit the invention to the embodiment illustrated.

Attachment apparatus 20 is shown in FIGS. 3, 4, 8–10 as comprising mount 22, at least one beam 24 and clamping member 26, means 28 for rotating the beam relative to the mount and means 30 for removing the beam from the mount. As can be seen in FIGS. 2, 8–10, attachment apparatus can be used for the attachment of various vehicle accessories to various structures in a vehicle. Of course, while most commonly used in a vehicle, the use of the apparatus is not limited to vehicles and vehicle accessories; the apparatus may likewise be used, without limitation, in association with any number of alternate uses, such as in the home or office, to name a few.

Mount 22 is shown in FIG. 4 as comprising channel region 32. Channel region 32, as will be explained, matingly engages with mount engagement region of the at least one beam 24. It will be understood that mount 22 may be a separate component which is attached to a vehicle accessory, such as a cupholder, through such attachment means as adhesive or fastener. Likewise, it is contemplated that mount 22 may be integrated with the vehicle accessory, and may be molded as a single unit therewith. Further still, it is contemplated that mount 22 and beam 24 may be integrally molded, wherein the beam is fixed with mount 22. Preferably, mount 22 may be constructed from a plastic, however, other materials such as metals are likewise contemplated for use.

Beam 24, and identical beam 24' (FIGS. 2, 8–10), are shown in FIGS. 4–8 as comprising first end 34, second end 36, longitudinal slot 38 (FIGS. 4, 6) and threadform 40 (FIGS. 4, 6). As will be understood, the structure of the beam will be described with respect to beam 24 with the understanding that beam 24' is substantially identical to beam 24.

First end 34 of beam 24 is shown in FIGS. 4–6 as including mount engagement region 56 which is slidably positioned within channel region 32 of mount 22. The mount engagement region 56 has a width and a height substantially corresponding to the width of channel region 32. As such, while the mount engagement region 56 does not rotate about its longitudinal axis while within channel 32, beam 24 may be positioned on its top, bottom or on either side in channel region 32, and beam 24 can slide therein. Second end 36 is positioned opposite first end 34 and is configured to be smooth and free of obstructions so that the second end can be inserted into a vehicle structure without inadvertent snagging and catching, of other undesired regions.

Longitudinal slot 38 is shown in FIGS. 4, 6 as comprising proximal end 46, distal end 48 and opposing walls 50, 50'. Proximal end 46 is positioned near first end 34 of beam 24. Proximal end 46 may extend only partially toward first end 34, or, it may abut first end 34. Distal end 48 is positioned near second end of beam 24. Distal end 48 may extend only partially to second end 36, or distal end may extend into abutment with second end 36. Additionally, while other configurations are contemplated, and as will be explained in detail below, second end 36 may include concave region 62 (FIG. 6) to further facilitate engagement with the vane of the vent.

As shown in FIGS. 4, 6, opposing walls 50, 50' extend on opposite sides from proximal end to the distal end of slot 38, and essentially define the width of the longitudinal slot. While other configurations are contemplated, opposing walls 50 and 50' are substantially parallel and positioned at a distance slightly greater than the thickness of the vane of the vent. One of opposing walls, such as opposing wall 50 includes opening 76 and guide member 63. Opening 76 extends entirely through opposing wall 50 and thereby creates a passage into the slot. Guide member 63 extends at an angle proximate opening 76. As will be explained, guide member facilitates the movement and eventual placement of the vane of the vent within the longitudinal slot.

Further opposing wall 50 is free to flex a certain predetermined amount. This flexing further facilitates the entry of the vane of the vent into the longitudinal slot. The flexing can be attributed to the natural flexing of the material, or, alternatively, the material may be treated or additional structures (such as springs) may be used to impart flexibility into wall 50.

Threadform 40 is shown in FIGS. 4 and 6 as extending along a portion of an outside surface of opposing wall 50'. The threadform comprises a standard threadform that can extend, as desired, from first end 34 to second end 36 or any shorter distance therebetween. Additionally, it is likewise contemplated that the threadform may extend along any other side or face of beam 24, so long as the clamping member 26 can interface therewith. It is contemplated that threadform be integrally molded with beam 24, however, additional screw structures as well as structures that are adhered to the beam are likewise contemplated for use. Moreover, the threadform may be positioned on other structures which additionally cover the threadform when not engaged with the clamping member to prevent the threadform from scratching and abrading the surrounding surface.

Clamping member 26 is shown in FIGS. 4–7 as comprising ring member 52 and movement preclusion means 66 and flex limiting means 68. Ring member 52 includes mating threadform 54 extending along the inside of the ring member. As will be explained, mating threadform is configured to engage threadform 40 of beam 24. The ring member may comprise a molded plastic member, or may comprise a conventional screw type member which has thread matching that of threadform 40.

Movement preclusion means 66 comprises carrier member 64 (FIG. 7), rack 70 and pawl 72. At least a portion of carrier member extends within ring member 52, and the carrier member is associated with the ring member so as to translate (along with the ring member) along beam 24. Carrier member 64 includes longitudinal extensions 74, 74' (FIG. 5) which extend to either side of the carrier member opposing wall 50. As the clamping member approaches opening 76, the longitudinal extensions extend beyond the opening toward the second end of beam 24. As such, the longitudinal extensions effectively seal the opening, further preventing the inadvertent disengagement of the vane of the vent from beam 24.

Rack 70 can be seen in FIGS. 5 and 6 as comprising a series of teeth extending uniformly about the outer circumference of ring member 52. Pawl 72 is attached to carrier member 64 and positioned such that the pawl interfaces with the rack 70. As such, to rotate the ring member, enough force must be imparted so as to overcome the force between rack 70 and pawl 72. Both the pawl and the rack may be molded with the carrier member and the ring member, respectively. Of course, other means of retaining the clamping member in a proper predetermined position are likewise contemplated, such as the use of screwed down lockout members, the use of variably sized threads that rely on the friction between the threadforms, among other solutions.

Means 28 for rotating the beam relative to mount 22 is shown in FIGS. 9 and 10 as comprising an enlarged area 42 of channel region 32. Enlarged area 42 of channel region 32 is larger than the width or the thickness of the mount engaging region. Thus, and as will be explained in detail, beam 24 is slid relative to the channel region until the engagement region is positioned in the enlarged area. At that time, the beam can be rotated about its longitudinal axis as desired.

Means 34 for removing the beam from mount 22 comprises specially adapting enlarged area 42 so that beam 24 must be rotated in a special manner so as to permit removal of the first end of the beam from within the mount. This further prevents inadvertent detachment of the beam from within the mount, which is especially helpful during setup and clamping of the vehicle structure of the clamping member.

In operation, attachment apparatus may be used to attach any variety of vehicle accessories, such as notepads, radar detectors and their brackets, cupholder, cellular telephone holders, among others, to vane of the vents, such as air conditioner/heater vent vanes, or other structures commonly found in vehicles. As explained, however, the invention is not limited to vehicle accessories and to use in association with vehicles. The uses and locations of use of the apparatus is without limitation.

The attachment of a cupholder through the use of such an apparatus to a vehicle air conditioning and heat vent vane will be explained hereinbelow. It will be understood that a mounting the bracket to other structures is completed through similar steps. Additionally, while the steps for attachment of a cupholder is explained below, the attachment of other vehicle accessories is likewise contemplated.

The first step of attaching the vehicle accessory to the vane of the vent is to determine the desired accessory and the desired positioning relative to the vane of the vent. Specifically, a user must first determine the appropriate positioning of the article. Once the desired vent or vents are determined, the user must position the beam, or beams, as desired relative to the channel region of the mount. Specifically, the beams are slid relative to channel member until positioned as desired. Additionally, if, for instance the vent structures are vertically oriented, beam 24 may be rotated relative to the channel through beam rotating means. Further, any beam may be removed, as needed, through beam removing means. This is especially useful wherein the particular vent is quite narrow and only a single beam may be used.

Figure 3:
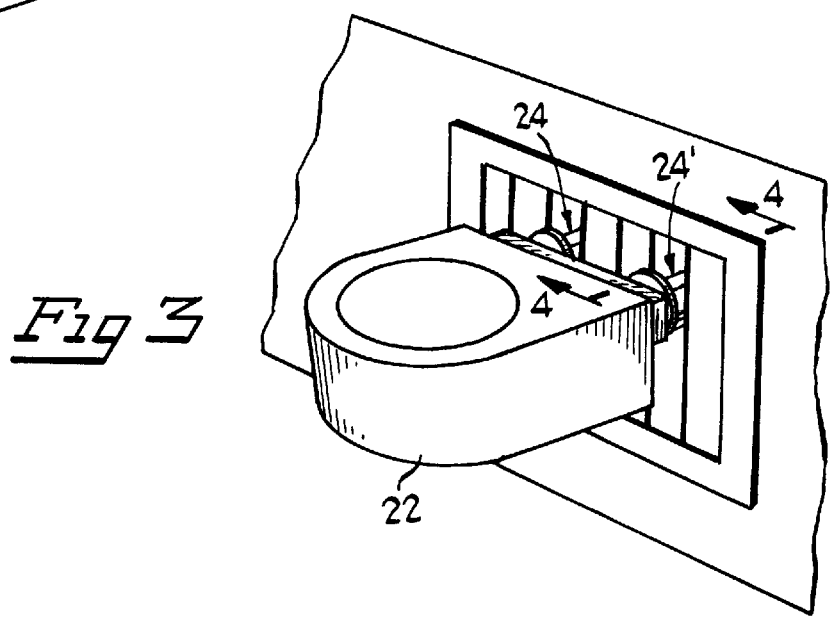
FIG. 3 of the drawings is a perspective view of the apparatus attached to a vehicle accessory and a vehicle structure.

Once properly configured, as shown in FIG. 3, beam 24 is attached into the vane of the vent. Specifically, second end 36 is inserted into the vent. As the second end is inserted, the vane of the vent enters through opening 76 and extends into longitudinal slot 38. Guide member 63 further facilitates the directing of the vane of the vent into the longitudinal slot. Additionally, due to the flexibility of opposing wall 50, by forcing opposing wall 50 against the vane of the vent, the effective size of opening 76 is increased to further facilitate the positioning of the vane into longitudinal slot 38.

Once the vane of the vent is fully inserted into the longitudinal slot, the beam is moved in the opposite direction—toward the first end thereof. This enables concave region of the distal end of the longitudinal slot to engage the vane of the vent, which, in turn, prevents inadvertent detachment of same.

Next, the user adjusts the clamping member to effectively clamp the vane of the vent between the distal end and the clamping member itself. Specifically, the user rotates the ring member as desired to move the clamping member longitudinally along beam 24 through the interfacing of the mating threadforms. As the clamping member proceeds longitudinally along the beam, eventually, the carriage member abuts the vane of the vent positioned within the longitudinal slot. As the user continues to rotate the ring member, the clamping force increases and eventually, the vane of the vent is securely clamped within the longitudinal slot between the carriage of the clamping member and the distal end of the slot.

Where the vane of the vent is quite narrow, and the distance between the clamping member and the distal end is exceedingly small, extension members 74, 74' of the carriage extend along either side of the opening, thus, closing the opening and preventing the inadvertent removal of the vane from within the longitudinal opening.

To retain the clamping member in the desired position, and to prevent any undesired movement of the clamping member which would tend to loosen the grip on the vane, pawl 72 interfaces with rack 70. Specifically, the pawl lodges between two teeth of the rack until sufficient rotative force is applied onto the ring member to overcome the force of the pawl. While the user is able to easily overcome the force of the pawl, the pawl is generally of sufficient strength that other outside forces, such as bumps, vibrations and other external interferences will not be of sufficient magnitude to overcome the force imparted by the pawl.

To remove the vane from within the longitudinal slot, the user must first rotate the ring member in a direction opposite the direction for tightening. As the clamping member proceeds in a direction away from the distal end of the longitudinal slot, the clamp is loosened and the vane of the vent is permitted to move within the longitudinal slot.

Once the clamping member is sufficiently moved away from the distal end of the longitudinal slot, one of the beam or the vane of the vent is moved so that the vane no longer rests within the concave region of the distal end of the slot. At such time, the beam is manipulated so that the vane is forced to extend back through opening 76 in wall 50. This may be accomplished by forcing the vane of the vent against opening 76, while at the same time pulling the beam outwardly, away from the vent. Due to the flexibility of wall 50, this movement of the beam effectively enlarges opening 76, and permits the vane to exit the longitudinal slot. As the user continues to pull out the beam, eventually, the entire beam exits from within the vent and, in turn, the two are separated. As will be understood, the attachment apparatus is fully reusable and may again be attached to the same vent, or to any other suitable vehicle structure, as desired.

The foregoing description and drawings merely explain and illustrate the invention and the invention is not limited thereto, as those skilled in the art who have the disclosure before them will be able to make modifications and variations therein without departing from the scope of the invention.

What we claim is:

1. An attachment apparatus for attachment of a vehicle accessory to a vehicle structure comprising:
   a mount for mounting the vehicle accessory, the mount having an opening;
   at least one beam having a first end engageable in the mount opening, a second end opposite the first end and a substantially longitudinal slot therebetween;
   the slot including a proximal end near the first end of the beam, a distal end near the second end of the beam, and opposing walls therebetween, one of the opposing walls having an opening for receiving the vehicle structure into the slot; and
   a clamping member movably positionable along at least a portion of the beam between the first and second ends thereof for clamping the vehicle structure therebetween.

2. An attachment apparatus for attachment of a vehicle accessory to a vehicle structure comprising:
   a mount for mounting the vehicle accessory,
   the mount including a channel;
   at least one beam having a first end engageable with the mount, a second end opposite the first end and a substantially longitudinal slot therebetween;
   the first end of the at least one beam including a mount engagement region,
   the mount including a channel configured to engage the mount engagement region, to, in turn, facilitate retained slidable movement of the mount engagement region along the channel,
   the slot including a proximal end near the first end of the beam, a distal end near the second end of the beam, and opposing walls therebetween, one of the opposing walls having an opening for receiving the vehicle structure into the slot; and
   a clamping member movably positionable along at least a portion of the beam between the first and second ends thereof for clamping the vehicle structure therebetween.

3. The attachment apparatus according to claim 2 further including means for rotating the at least one beam along a longitudinal axis thereof relative to the mount.

4. The attachment apparatus according to claim 3 further including means for disengaging the at least one beam from the mount.

5. The attachment apparatus according to claim 2 wherein:
   the at least one beam further includes a first threadform extending longitudinally between the first and second ends thereof;
   the clamping member including a ring member extending transversely around the at least one beam, the ring member including a second mating threadform engaging the first threadform of the at least one beam, wherein rotation of the ring member about the at least one beam member in a first direction moves the clamping member toward the first end of the beam, and rotation of the ring member about the at least one beam in a direction opposite the first direction moves the clamping member toward the second end of the at least one beam.

6. The attachment apparatus according to claim 2 wherein the opposing wall having the opening is capable of flexing, to in turn, temporarily enlarge the opening for accepting the vehicle structure.

7. The attachment apparatus according to claim 2 wherein the opposing side wall having the opening includes a guide member proximate the opening for guiding the vehicle structure into the slot.

8. The attachment apparatus according to claim 2 wherein the at least one beam comprises two beams each of the beams independently associated with the mount.

9. The attachment apparatus according to claim 2 wherein the opening is positioned proximate the distal end of the slot.

10. An attachment apparatus for attachment of a vehicle accessory to a vehicle structure comprising:
    a mount for mounting the vehicle accessory;
    at least one beam having a first end engageable with the mount, a second end opposite the first end and a substantially longitudinal slot therebetween;
    the slot including a proximal end near the first end of the beam, a distal end near the second end of the beam, and opposing walls therebetween, one of the opposing walls having an opening for receiving the vehicle structure into the slot;
    a clamping member movably positionable along at least a portion of the beam between the first and second ends thereof for clamping the vehicle structure therebetween;
    the at least one beam further including a first threadform extending longitudinally between the first and second ends thereof;
    the clamping member including a ring member extending transversely around the at least one beam, the ring member including a second mating threadform engaging the first threadform of the at least one beam, wherein rotation of the ring member about the at least beam member in a first direction moves the clamping member toward the first end of the beam, and rotation of the ring member about the at least one beam in a direction opposite the first direction moves the clamping member toward the second end of the at least one beam; and
    means for precluding the inadvertent rotation of the ring member about the at least one beam member.

11. The attachment apparatus according to claim 10 wherein the clamping member further includes a carrier member configured to slidably move along the at least one beam member upon rotation of the ring member about the at least one beam member, and, in turn, translation along the at least one beam member, the rotation precluding means comprising:
    a pawl associated with the carrier member; and
    a rack associated with the carrier member cooperating with the pawl to releasably restrain the ring member and, in turn, prevent inadvertent undesired rotation of the ring member.

12. The attachment apparatus according to claim 11 wherein the rack extends around the circumference of the ring member.

13. The attachment apparatus according to claim 11 wherein the carrier member further includes at least one longitudinal extension corresponding to the opposing wall having an opening therethrough, the longitudinal extension, positionable to close at least a portion of the opening, to in turn, prevent inadvertent removal of the vehicle structure.

14. The attachment apparatus according to claim 10 further including means for rotating the at least one beam along a longitudinal axis thereof relative to the mount.

15. The attachment apparatus according to claim 10 wherein the opposing side wall having the opening includes a guide member proximate the opening for guiding the vehicle structure into the slot.

16. An attachment apparatus for attachment of a vehicle accessory to a vehicle structure comprising:
- a mount for mounting the vehicle accessory;
- at least one beam having a first end engageable with the mount, a second end opposite the first end and a substantially longitudinal slot therebetween; and
- the slot including a proximal end near the first end of the beam, a distal end near the second end of the beam, and opposing walls therebetween, one of the opposing walls having an opening for receiving the vehicle structure into the slot;
- a clamping member movably positionable along at least a portion of the beam between the first and second ends thereof for clamping the vehicle structure therebetween; and
- the distal end of the slot member including a substantially concave region for retaining a portion of the vehicle structure within the slot.

17. An attachment apparatus for attachment of a vehicle accessory to a vehicle structure comprising:
- a mount for mounting the vehicle accessory;
- at least one beam having a first end engageable with the mount, a second end opposite the first end and a substantially longitudinal slot therebetween;
- the slot including a proximal end near the first end of the beam, a distal end near the second end of the beam, and opposing walls therebetween, one of the opposing walls having an opening for receiving the vehicle structure into the slot;
- a clamping member movably positionable along at least a portion of the beam between the first and second ends thereof for clamping the vehicle structure therebetween;
- the opposing wall having the opening being capable of flexing, to in turn, temporarily enlarge the opening for accepting the vehicle structure; and
- the clamping member including means for limiting the relative flexing of the opposing wall having the opening.

18. The attachment apparatus according to claim 17 further including means for rotating the at least one beam along a longitudinal axis thereof relative to the mount.

19. The attachment apparatus according to claim 17 wherein the opposing side wall having the opening includes a guide member proximate the opening for guiding the vehicle structure into the slot.

20. An apparatus for attachment of a vehicle accessory to a vehicle structure comprising:
- a mount for mounting the vehicle accessory;
- at least one beam having a first end engageable with the mount, a second end opposite the first end and a substantially longitudinal slot therebetween;
- the slot including a closed proximal end near the first end of the beam, a closed distal end near the second end of the beam, and opposing walls therebetween, one of the opposing walls having an opening for receiving the vehicle structure into the slot; and
- a clamping member movably positionable along at least a portion of the beam between the first and second ends thereof for clamping the vehicle structure therebetween.

* * * * *